(12) United States Patent
Bolik et al.

(10) Patent No.: US 9,952,940 B2
(45) Date of Patent: Apr. 24, 2018

(54) METHOD OF OPERATING A SHARED NOTHING CLUSTER SYSTEM

(71) Applicant: INTERNATIONAL BUSINESS MACHINES CORORATION, Armonk, NY (US)

(72) Inventors: Christian Bolik, Oldenburg (DE); Nils Haustein, Mainz (DE); Dominic Mueller-Wicke, Mainz (DE); Thomas Schreiber, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/827,867

(22) Filed: Aug. 17, 2015

(65) Prior Publication Data
US 2016/0048430 A1 Feb. 18, 2016

(30) Foreign Application Priority Data
Aug. 18, 2014 (GB) .................................. 1414592.4

(51) Int. Cl.
*G06F 11/14* (2006.01)
(52) U.S. Cl.
CPC ...... *G06F 11/1469* (2013.01); *G06F 11/1448* (2013.01); *G06F 11/1456* (2013.01); *G06F 11/1458* (2013.01)
(58) Field of Classification Search
CPC ............. G06F 11/1469; G06F 11/1448; G06F 11/1456; G06F 11/1458
See application file for complete search history.

(56) References Cited

U.S. PATENT DOCUMENTS

| 6,397,308 B1* | 5/2002 | Ofek ................... G06F 12/1458 |
| | | 711/148 |
| 7,143,122 B2* | 11/2006 | Burton ................ G06F 11/2074 |
| | | 707/613 |

(Continued)

FOREIGN PATENT DOCUMENTS

| WO | WO9116677 A1 | 10/1991 |
| WO | WO2005045606 A2 | 5/2005 |
| WO | WO2012047503 A2 | 4/2012 |

OTHER PUBLICATIONS

Search Report for GB1414592.4 dated Feb. 27, 2015, pp. 1-4.
(Continued)

*Primary Examiner* — Michael Krofcheck
*Assistant Examiner* — Patrick W Borges
(74) *Attorney, Agent, or Firm* — Heslin Rothenberg Farley & Mesiti P.C

(57) ABSTRACT

Operating a shared nothing cluster system (SNCS) in order to perform a backup of a data element. The SNCS includes at least a first and a second storage node connected via a first network of the SNCS. The first and second storage nodes are configured to store a first set and a second set of blocks, respectively, in which the first and second set of blocks form a single data element. A backup server is connected to the first and second storage nodes, and the backup server includes a backup information table. The first and second storage nodes are configured to act as backup clients in a client-server configuration involving the backup server, upon receiving at the first and the second storage nodes a request to backup the data element. For each node of the first and second storage nodes, the node identifies one or more block sequences of consecutive blocks in a set of blocks of the data element stored in the node. The node sends the (Continued)

identified one or more block sequences to the backup server, and generates backup information.

19 Claims, 8 Drawing Sheets

(56) References Cited

U.S. PATENT DOCUMENTS

| | | | |
|---|---|---|---|
| 7,890,555 B2 | 2/2011 | Gunda et al. | |
| 8,219,769 B1* | 7/2012 | Wilk | G06F 11/1464 707/640 |
| 8,667,033 B1 | 3/2014 | McCline et al. | |
| 8,701,113 B2 | 4/2014 | Hildebrand et al. | |
| 2002/0052941 A1* | 5/2002 | Patterson | G06F 9/5061 709/223 |
| 2009/0063589 A1 | 3/2009 | Cox et al. | |
| 2009/0313503 A1* | 12/2009 | Atluri | G06F 11/1453 714/19 |
| 2012/0079323 A1* | 3/2012 | Chincisan | H04L 1/1642 714/18 |
| 2012/0229482 A1* | 9/2012 | Oka | G06T 15/005 345/522 |
| 2013/0151494 A1 | 6/2013 | Dhamankar et al. | |
| 2013/0198309 A1 | 8/2013 | Muller et al. | |
| 2014/0074787 A1 | 3/2014 | Berman et al. | |

OTHER PUBLICATIONS

Jain, R., et al., "GPFS-SNC: An Enterprise Cluster File System for Big Data," IBM Journal of Research and Development, May-Jul. 2013, pp. 5:1-5:10.

Khalid, A., et al., Balancing Scalability, Performance and Fault Tolerance for Structured Data (BSPF), 2014 16$^{th}$ International Conference on Advanced Communication Technology, Feb. 2014, pp. 725-732.

* cited by examiner

| Backup Run | Object Name | Block Sequence Number | Block Sequence Begin | Block Sequence End | Node Name | Final Sequence | Action Complete | Storage Location |
|---|---|---|---|---|---|---|---|---|
| 0001 | /fs1/file1 | 0 | 0 | N-5 | NODE_110 | FALSE | B | /pool1/01/002 |
| 0001 | /fs1/file1 | 2 | N | M-10 | NODE_110 | TRUE | B | /pool1/02/015 |
| 0001 | /fs1/file1 | 1 | N-4 | N-1 | NODE_111 | FALSE | B | /pool1/05/001 |
| 0001 | /fs1/file1 | 4 | M | EOF | NODE_111 | TRUE | B | /pool1/03/078 |
| 0001 | /fs1/file1 | 3 | M-1 | M-9 | NODE_112 | TRUE | B | /pool1/08/013 |

FIG. 3

METHOD OF OPERATING A SHARED NOTHING CLUSTER SYSTEM

PRIOR FOREIGN APPLICATION

This application claims priority from United Kingdom (GB) patent application number 1414592.4, filed Aug. 18, 2014, which is hereby incorporated herein by reference in its entirety.

BACKGROUND

One or more aspects of the invention relate to computing systems, and more particularly to operating a shared nothing cluster system.

The significant growth of data confronts system administrators with new challenging situations in terms of data protection. In large storage systems, data is not just stored to have it available for seldom future usage. Analytics and stream computing require immediate access to all the data stored in such a system in different manners. The listed and other aspects of data collection and data usage are described with the acronym Big Data. To allow immediate access to all the data, new system architectures were defined that implement physically short distances between the data stored on disk and the nodes that process the data. The most common architecture in this area is the so called Shared Nothing Cluster. However, there is a continuous need to improve the storage performance of such shared nothing clusters.

SUMMARY

One or more aspects provide for an improved method of operating a shared nothing cluster system, a shared nothing cluster system, a backup server, a node and a computer program product.

In one aspect, a method of operating a shared nothing cluster system is provided. The shared nothing cluster system includes at least a first and a second storage node connected via a first network of the shared nothing cluster system, the first and second storage nodes being configured to store a first set and second set of blocks respectively, wherein the first and second set of blocks form a single data element. The method includes, for instance, providing a backup server being connected to the first and second storage nodes, the backup server comprising a backup information table; configuring the first and second storage nodes to act as backup clients in a client-server configuration involving the backup server; based on receiving at the first and second storage nodes a request to backup a data element, for each node of the first and second storage nodes: identifying by the node one or more block sequences of consecutive blocks in a set of blocks of the data element stored in the node; sending by the node the identified one or more block sequences to the backup server; generating by the node backup information indicating at least: an order of each block in each of the one or more block sequences; an order of each of the one or more block sequences in the one or more block sequences, and the node and the data element; sending by the node the backup information to the backup server; storing by the backup server each received block sequence of the one or more block sequences in a respective storage location in the backup server; creating by the backup server for each of the received one or more block sequences an entry in the backup information table, wherein the entry comprises at least the storage location of the block sequence and associated backup information in the backup server; adding and setting by the backup server a first flag into at least one of the created entries, based on a complete reception and storage of the one or more block sequences; and based on a determination by the backup server that the first and second set of blocks are associated with the first flag, adding and setting a second flag to at least one of the created entries for the first and second set of blocks indicating a completion of the backup of the data element.

BRIEF DESCRIPTION OF THE DRAWINGS

In the following, embodiments of the invention will be described in greater detail by way of example only making reference to the drawings in which:

FIG. 3 illustrates a backup information table;

DETAILED DESCRIPTION

Figure 1:
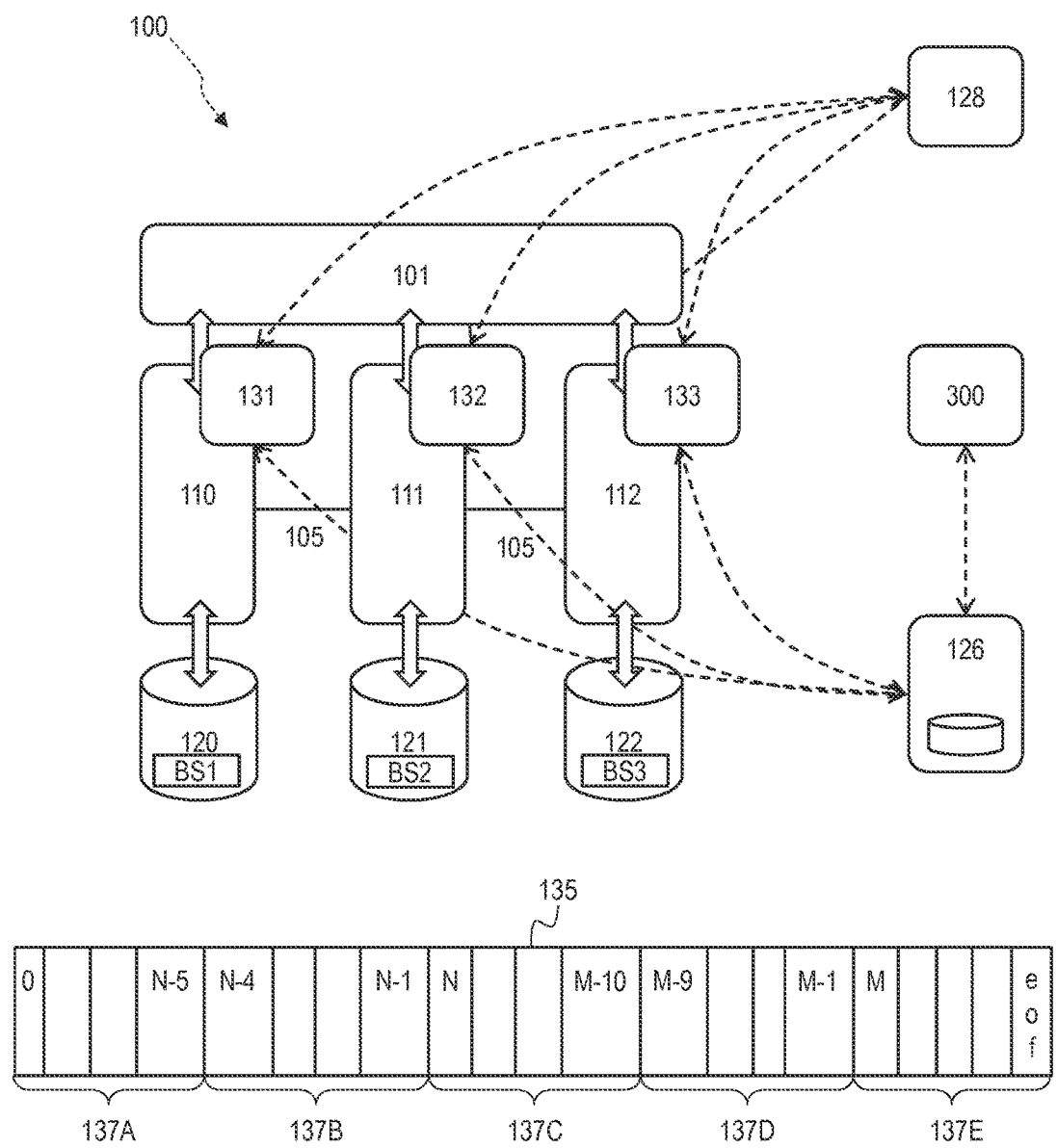
FIG. 1 illustrates an architecture of a shared nothing cluster system.

In the following, like numbered elements in the figures either designate similar elements or designate elements that perform an equivalent function. Elements which have been discussed previously will not necessarily be discussed in later figures if the function is equivalent.

As used herein, the shared nothing cluster system (SNCS) refers to a distributed computing architecture where each node is independent and self-sufficient, without the need to directly share memory or disk access with other nodes of the SNCS. For example, the first (second) storage node has independent access and/or control of the first (second) set of blocks.

A client-server configuration is a system where one or more computers (e.g. first and second storage nodes) called clients connect to a central computer named a server to use resources such as storage and/or processing resources, i.e. the server is used to "serve" client computers.

As used herein, the term "node" refers to any communication entity such as a processor, a computer (for instance a client computer), which can be operated within a communication network (such as the public Internet, an intranet, a telecommunication network, etc., or a combination of such networks). A node may have processing and storage capability for fulfilling assigned tasks in the framework of a shared nothing cluster system.

The first (second) storage node is configured to store the first (second) set of blocks locally in the first (second) storage node or in a respective storage device that is directly connected to the first (second) node.

The request to backup the data element may be received, for example, from a user of the SNCS or from a computer system connected to the SNCS.

One idea of the invention is the usage of the shared nothing cluster architecture for backup. This may be accomplished by introducing a backup client to each storage node of the shared nothing cluster and a file entry table provided by the backup server which provides the ability to store and identify file block metadata, wherein if a backup is initiated, the initiator informs other storage nodes via a restricted channel, and each storage node acts independent and backs up file blocks accessible on the given node. Each backup client sends its file blocks to the backup server which updates the file entry table and stores the data.

According to one embodiment, the request to backup the data element may be received via the first network. The first network may have a limited or restricted bandwidth. For example, one node of the first and second storage nodes may be the initiator (i.e., the first receiving or generating the backup request) of the backup request and may send or forward the backup request via the first network to the other storage node of the first and second storage nodes. In an alternative example, the first and second storage nodes may both receive the backup request via the first network.

The term "data element" or "file system object" as used herein refers to information that is stored in a data field. The data element may have a size of multiple data blocks. The data element may be split in blocks of data, and each of them may be stored in a unit of data storage on a device. Examples of data elements comprise a document file, an image file, an audio file, a video file, a data folder or container, etc. For example, the data element may refer to information, and may comprise multiple blocks or data blocks, e.g., of fixed size or variable size depending on the storage node where a block is stored. A block sequence of the data element may comprise consecutive blocks of the data element that refer or contain a portion of the information.

The above features may have the advantage of reducing the data traffic in the SNCS compared to conventional methods. In a shared nothing cluster, of the conventional methods, when a backup client—running on one storage node—reads a file system object (e.g., the data element) in the shared nothing cluster, several blocks of the file system object come from other storage nodes than the one where the backup client runs on. This causes extra data on the network (e.g., the first network which may have a limited bandwidth), and is therefore, inefficient.

The above features may enable the restore or recovery of data (when needed) stored in the SNCS.

Another advantage may reside in the fact that aspects of the present method may be seamlessly integrated in the existing shared nothing cluster systems as it makes use of the infrastructure of shared nothing systems and introduces changes with reduced burden into the shared nothing cluster system.

According to one embodiment, the SNCS comprises a local table for storing placement information of the one or more block sequences of the data element. The method further comprises receiving at the first and second storage nodes a restore request for restoring the data element. The method further comprises for each node of the first and second storage nodes: accessing the backup information table for identifying entries associated with the one or more block sequences of the data element that are associated with the node; determining that the second flag is set for the data element; retrieving the one or more block sequences and the associated backup information; storing the one or more block sequences in the node and updating the local table using the backup information to indicate the stored one or more block sequences; determining that the one or more block sequences of the first and second set of blocks have been restored and responsive to this, marking the identified entries as restored.

According to one embodiment, adding and setting by the backup server the first flag is performed after a waiting time is elapsed starting from the time at which a block sequence of the one or more block sequences is first received. If after the waiting time at least part of the one or more block sequences is not received, the first flag may not be set, e.g., it may be equal to "FALSE" or an empty value. This may be advantageous as it may prevent the association of incomplete information with the data element in the backup server. For example, if a restore request is received for restoring the data element after the waiting time, and at least part of the one or more block sequences is not received, the backup server may read the first flag and send a meaningful error message to mention that the data element is not fully backed up. However, if such waiting time constraint is not introduced, the backup server may not be able to read the first flag as it is not set or has no value, and thus may, if any, send a non-meaningful error message.

According to one embodiment, the waiting time is determined by upon receiving a first block sequence of the one or more block sequences, determining a transmission time delay for transmitting a block sequence of the one or more block sequences from the node to the backend server; and using the transmission time delay and the number of one or more block sequences for determining the waiting time.

According to one embodiment, the sending of the one or more block sequences is performed in parallel or in sequence. Depending on the available resources, the SNCS may have the choice of using one of the submission methods.

According to one embodiment, the method further comprises deleting the identified one or more block sequences from the node. This may have the advantage of using the SNCS for a distributed archiving of data.

According to one embodiment, the method further comprises generating by the node links pointing to the identified one or more block sequences in the backup server and storing the links in the node. The links may comprise stub files. A stub file refers to a file that replaces the original file on a local file system, e.g., in the storage node when the file is migrated to storage, e.g., to the backup server. A stub file contains the information that is necessary to recall a migrated file from server storage. It also contains additional information that can be used to eliminate the need to recall a migrated file. This may have the advantage of using the SNCS for a distributed migration of data.

According to one embodiment, the method further comprises in response to a determination by the backup server that at least one of the first and second sets of blocks is not associated with the first flag, sending a backup failure message to the sender of the request.

According to one embodiment, the first and second storage nodes are connected to the backup server via a second network different from the first network. For example, the first and the second network are able to communicate at a first and a second bandwidth, respectively. The first bandwidth is smaller than the second bandwidth. The second network may comprise a wired or a wireless LAN. The second network may be a public network, such as the Internet, a private network, such as a wide area network (WAN), a storage area network (SAN) or a combination thereof.

According to one embodiment, the SNCS further comprises a third storage node. The method further comprises at least one node of the first and second storage nodes sending information indicating the first, second and third storage nodes; the backup server upon setting the second flag, redistributing the blocks of the block sequences of the data element into restore block sequences; assigning the restore block sequences to the first second and the third storage nodes; updating the backup information table for associating to each of the first, second and third storage nodes its assigned restore block sequences and information indicative of the restore block sequences.

For example, when restoring or retrieving the data element the same method of the restore embodiment may be used. However, the results may be different in the sense that the data element when retrieved may be stored in the first, second and third storage nodes following the assignment that has been used by the backup server.

The information indicating the first, second and third storage nodes may comprise the number of storage nodes in the at least first, second and third storage nodes.

The information indicative of the restore block sequences may comprise, for example, at least: the order of each block in each of the restore block sequences, and the order of each of the restore block sequences in the block sequences that are assigned to a given node of the first second and the third storage nodes, and which block sequence belongs to each node of the first, second and third storage nodes, and an indication of the data element, e.g., its filename.

In an alternative embodiment, the method of the above embodiment may be performed for a reduced number of storage nodes of the at least first and second storage nodes, e.g., the block sequences may be assigned to only the first storage node.

According to one embodiment, the information indicating the first, second and third storage node comprises the system load in each of the first, second and third storage nodes, wherein the assigning is performed based on the system load.

The system load may comprise the CPU load and/or I/O load. The CPU load refers to a measure of the load on a central processing unit of a computer or a storage node, and may be expressed as the amount of CPU time being used by applications and the operating system of the storage node per unit of time.

The system load may be a measure of the amount of computational work that a storage node performs, e.g., for I/O activities (e.g., CPU load for I/O). For example, the higher the system load in a node the smaller the number of blocks or clock sequences to be stored in that node.

FIG. 1 describes one example of the architecture of a shared nothing cluster system 100 in accordance with aspects of the present disclosure.

Component 101 describes the common namespace (such as a file system). The common namespace may be, for example, a file system mount point that allows read and write activities on the storage nodes, but is not limited to this.

Components 110, 111 and 112 describe the storage or compute nodes. Storage nodes 110-112 are interconnected via a compute node network 105. The connection via network 105 may have a limited bandwidth and may be used to exchange metadata and/or a small amount of data such as to indicate a backup request.

Components 120, 121 and 122 describe the local storage devices. Each storage device 120-122 is directly connected to one corresponding storage node 110-112 and can be directly accessed from this node. In an alternative example, the storage devices 120-122 may be part of the storage nodes 110-112, respectively.

The combination of storage nodes and storage devices such as 110+120, 111+121 and 112+122 represent three independent compute-storage nodes that provide the storage for the common namespace 101. The common namespace 101 logically represents the storage provided by all compute-storage nodes 110+120, 111+121 and 112+122.

File system objects or data elements are stored via the common namespace 101. File system objects, like normal files with a size of multiple file system blocks, may be split into block sequences. Each block sequence will be stored on one of the storage devices 120-122. The different block sequences of a single file may be distributed on storage devices 120-122.

For example, when a data element or a data file 135 is received at the SNSC 100 for storage in the SNCS 100, the data element 135 may be split by the common namespace 101 into block sequences 137A-E (data block sequences). For example, the blocks forming the data element 135 may be stored in this order "137A-137B-137C-137D-137E". For simplicity of the description, it is shown in FIG. 1 only five block sequences forming the data element 135. For example, block 0 to N-5 is collocated to block sequence 137A. Block N-4 to N-1 is collocated to block sequence 137B. Block N to M-10 is collocated to block sequence 137C. Block M-9 to M-1 is collocated to block sequence 137D. Block M to EOF is collocated to block sequence 137E.

The common namespace 101 may calculate (e.g., taking into account the available resources in the storage nodes 110-112) the optimal placement for the block sequences 137A-E and distribute them on different storage devices 120-122. For example, a first set of blocks BS1 may comprise the block sequences 137A and 137C, and a second set of blocks BS2 may comprise the block sequences 137B and 137E, and a third set of blocks BS3 may comprise the block sequence 137D, wherein the first set of blocks BS1 may be stored in the storage device 120, the second set of blocks BS2 may be stored in the storage device 121 and the third set of blocks BS3 may be stored in the storage device 122. In another example, a random placement of the block sequences 137A-E may be performed.

The placement information, such as which block of the data element 135 is on which storage device, is defined in a local table 128. Table 128 might be part of the metadata of the file system provided by the common namespace 101. Table 128 may be accessed from common namespace 101 internally and provides an API (application programming interface) for external applications.

In an alternative example, the table 128 may be stored in each storage node 110-112.

In terms of a read of the normal file, e.g., data element 135, the storage nodes may read the information stored in the table 128 and coordinate the read of the block sequences 137A-E. The actual read of a single block sequence will be performed on the storage node, e.g. 110, that has the block sequence, e.g., 137A stored in its storage only.

The SNCS 100 may further comprise a backup server 126. The backup server 126 comprises a backup storage (like disk or tape) to store file system objects (or data elements). Storage nodes 110-112 may be configured to act as backup clients in a client-server configuration involving the backup server 126. For example, components 131, 132 and 133 represent the backup client components that run on the storage nodes 110, 112, respectively.

The backup clients have access to local table 128 that stores the placement information of the block sequences stored on the storage devices 120-122. Furthermore, the backup clients are connected to the backup server 126.

The backup server 126 comprises a backup information table 300 (cf. FIG. 3) that holds backup version information and block sequence information of each file received and stored in the database server 126.

The backup server 126 manages and maintains the backup information table 300 that holds information required to ensure the completeness of a data file backup. Furthermore, the table 300 is used to gather the required information for the data file restore and to ensure the completeness of the restore of the data files.

One example of the operation of the data processing system 100 will be described in detail with reference to FIGS. 2-8.

Figure 2:
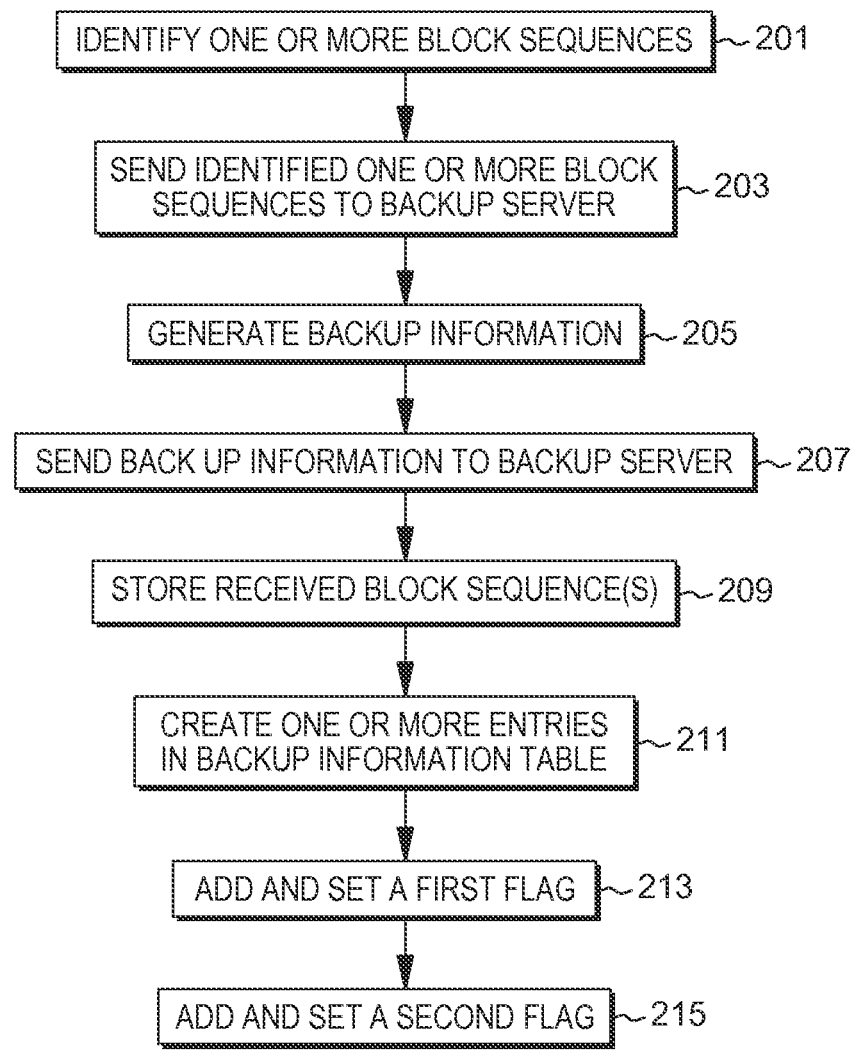
FIG. 2 is a flowchart of a method of operating a shared nothing cluster system.

FIG. 2 is a flowchart of a method of operating a SNCS, e.g., 100. A request to backup a data element or data file e.g. 135 being stored in the SNCS 100 may be received at the storage nodes 110-112. For example, storage node 110 may receive the request and then forward it to the other storage nodes 111-112 via network 105. In an alternative example, the request may be received by each one of the storage nodes 110-112. For example, the request may be received via component 101 either automatically or triggered by a request of a user of the SNCS 100. The method steps 201-215 may be executed for each node of the storage nodes 110-112. For example, the steps 201-215 may be executed in parallel on the storage nodes 110-112.

In step 201, the node, e.g., 110 may identify one or more block sequences of consecutive blocks in the set of blocks of the data element 135 stored in the node. For example, storage node 110 may identify block sequences 137A and 137C of the set of blocks BS1. For example, the storage node 110 may read the local table 128 of the common namespace 101 to identify the one or more block sequences. In another example, the storage node 110 may identify by itself the one or more block sequences that belong to the data element 135, e.g., by reading the table 128 being locally stored in the storage node 110.

In step 203, the node 110 may send the identified one or more block sequences 137A and 137C to the backup server 126. The sending of the one or more block sequences is performed in parallel or in sequence, e.g., 137A is first sent and then 137C is sent. The parallel submission may be performed using distributed parallel processing resources in the node 110, which may speed up the backup process.

In step 205, the node 110 may generate backup information indicating at least the order of each block in each of the one or more block sequences, the order of each of the one or more block sequences in the one or more sequences of blocks, the node, and the data element. For example, the generation of the backup information may be performed in parallel to or after the identification of the one or more block sequences is performed. For example, the local table 128 may be read for the identification and for generation of the backup information. For example, the order of block N in the block sequence 137C may be 0 since it is the first block of the block sequence 137C and the order of block M-10 in the block sequence 137C may be M-10-N. The order of block sequence 137A may be for example 1/2 (indicating its order within two block sequences) in the set of blocks BS1, and block sequence 137C may have an order 2/2 in the set of blocks BS1. An indication of the node may comprise, for example, at least one of an IP address, port number, Fiber Channel address or any data able to identify the node 110. The indication of the data element may be for example its name, e.g., filename.

For example, in case the backup information table 300 (FIG. 3) is created before step 205, the backup information may be generated in accordance with at least part of the backup information table 300 such that it can be efficiently used to fill the fields of the backup information table 300. For example, if a field concerns a given parameter X, the backup information may be generated such that it contains values of parameter X or other values from which the parameter X value can be derived. In another example, the backup information table 300 may be created as soon as the first block sequence of the data element 135 or any data element stored in the backup server 126 is first received.

For example, the backup information for a given block sequence may indicate values for the fields 301-306 (FIG. 3, described below) of the backup information table 300.

In step 207, the node 110 may send the backup information to the backup server 126. The submission of the backup information may be performed together with or after the submission of the identified one or more block sequences.

In step 209, the backup server 126 may store each received block sequence of the one or more block sequences in a respective storage location 309 (FIG. 3) in the backup server 126.

In step 211, the backup server 126 may create for each of the received one or more block sequences an entry in the backup information table 300, wherein the entry comprises at least the storage location of the block sequence and the associated backup information in the backup server. For example, after receiving block sequence 137A, the backup server 126 may create an entry 311 in table 300 such that the fields 301-309 may be filled. For example, in field 302 the name of the data element 135 may be filled. In field 303, the sequence number of the block sequence 137A, which may be 0 as it is the first sequence in the data element 135 may be filled (e.g., the sequence number of block sequence 137C is 2).

In step 213, the backup server 126 may add and set a first flag 307 into at least one of the created entries in case of a complete reception and storage of the one or more block sequences. The first flag being set means that it indicates the complete reception of the one or more block sequences. The first flag may comprise a Boolean or a number, etc. The first flag is set, for example, when its Boolean value is equal to "TRUE". For example, as soon as the last block sequence of the block sequences 137A and 137C is received, the backup server 126 may fill the field 307 with "TRUE" for the entry 313 and/or entry 314 to indicate that all the block sequences of the data element 135 that are stored in node 110 are received at the backup server 126. For determining that the reception (e.g., of 137A and 137C) is complete, the backup server 126 may use the backup information to determine the order of the received block sequence 137A, e.g., 1/2 in the block sequences 137A and 137C of BS1. Assuming that the block sequence 137A is first received, the backup server 126 may determine by reading the denominator that there are two block sequences of the data element 135 that may be received from the node 110 and that one of them having order 1 is received. In this case, as soon as another block sequence of the data element 135 is received from the node 110 and having an order that is different from the order of the previously received block sequence 137A, the backup server 126 may set the first flag to "TRUE" in entry 314 and/or 313.

In an alternative example, the backup server 126 may determine that the reception (e.g., of 137A and 137C) is complete using the backup information, wherein the backup information indicates the final sequence, e.g. of 137A and 137C to be received by the backup server 126. For example, the block sequences 137A and 137C may be sent in sequence one after the other, and may also be received one after the other, i.e., 137A, then 137C. In this case, the backup information associated with each block sequence may comprise an indication of whether the block sequence is the final (e.g., last submitted) one or not (e.g., 137A may be associated with an indication that it is not final as it is the first one submitted and 137C may be associated with an indication that it is final). The backup server 126 may use such an indication associated with each block sequence and if it determines that it is final, it sets the first flag to "TRUE" in entry 314. The first flag may be "False" or empty in entry 313. In another example, it may set the first flag to "TRUE" in entries 313 and 314.

In step 215, in response to a determination by the backup server 126 that the sets of blocks BS1, BS2 and BS3 are associated with the first flag (the first flag being set), adding and setting a second flag (e.g., 308 "ACTION COMPLETE") to at least one of the created entries for the first and second sets of blocks indicating the completion of the backup of the data element (i.e., the data element has been backed up). For example, the backup server 126 may determine that the first flag is set (e.g., to "TRUE") for at least one block sequence of each set of blocks BS1-BS3 i.e. in other terms the sets of blocks BS1, BS2 and BS3 are associated with the first flag. The second flag may thus be set, e.g., to "B" for the block sequences of the set of blocks BS1-BS3.

FIG. 3 shows an example structure of the backup information table 300 of the backup server 126. The table 300 comprises entries 313, 314, 315, 316, and 317 created for the respective block sequences 137A, 137C, 137B, 137E and 137D. The backup information table shows an example of a complete backup of the data element 135.

The columns of table 300 as shown in FIG. 3 are defined as follows.

Backup Run 301: The number of a backup run of a complete file system backup including multiple single file system object backups (e.g. 0001). Backup run 0001 indicates that all block sequences of the file (e.g. data element 135) are part of the same file version. The file system object or data element 135 that was backed up has the name /fs1/file1 (column object name).

Object Name 302: The full qualifying name of a file system object (e.g. /mountpoint/path/filename)

Block Sequence Number 303: Logical location of the block sequence inside the data element 135. For example, the block sequence number of the block sequence 137A may be 0, since it is contains the first blocks that form the data element 135.

Block Sequence Begin 304: First logical block in the complete block sequence of the file system object (e.g., 0)

Block Sequence End 305: Last logical block in the complete block sequence of the file system object (e.g., 4).

Node Name 306: The name of the backup client node (i.e. storage node 110-112) that sends the block sequence for backup (e.g., NODE_110).

Final Sequence (the first flag) 307: A flag that indicates that the block sequence sent from the storage node is received in a complete fashion with the other block sequences of the data element that are stored together with the block sequence in the storage node. In another example, the flag may indicate that the corresponding block sequence is the last block sequence of the data element 135 that is received from the specified node. In this case, for example, the flag may be received from the specified node in association with the block sequence.

For example, the flag may be set based on an indication of the order of a block sequence of a data file in the one or more sequences of blocks of the data file stored in the storage node that has sent the block sequence. For example, the indication of block sequence 137A may be "1/2", where the numerator may be the order of the block sequence 137A and the denominator is the number of block sequences, i.e. 137A and 137C. In this example, the block sequence 137C may be indicated by "2/2". Using the final sequence 307, the backup server 126 may be able to determine whether it received all the block sequences of a given data element that are stored in a given storage node.

Action Complete (the second flag) 308: A flag that indicates the completeness of the backup or restore of a block sequence (e.g. "B" may indicate a Backup is Complete; "BR" may indicate Restore Complete; "A" may indicate Archive Complete; "AR" may indicate Retrieve Complete; "M" may indicate migration complete; and "U" may indicate recreation complete).

Storage Location 309: Path to the storage location where the block sequence is stored in the backup server (e.g. /pool2/004/00123).

For example, if a storage node (not shown) of the SNCS 100 does not contain any blocks of the data element, it may send empty action complete information for the data element to indicate that it is finished. An entry may thus be added to the backup information table that indicates the storage node and the data element, and in which the final sequence (i.e., the first flag) is set to "True". After all affected storage nodes send the final block sequence, the backup run is finished.

Figure 4:
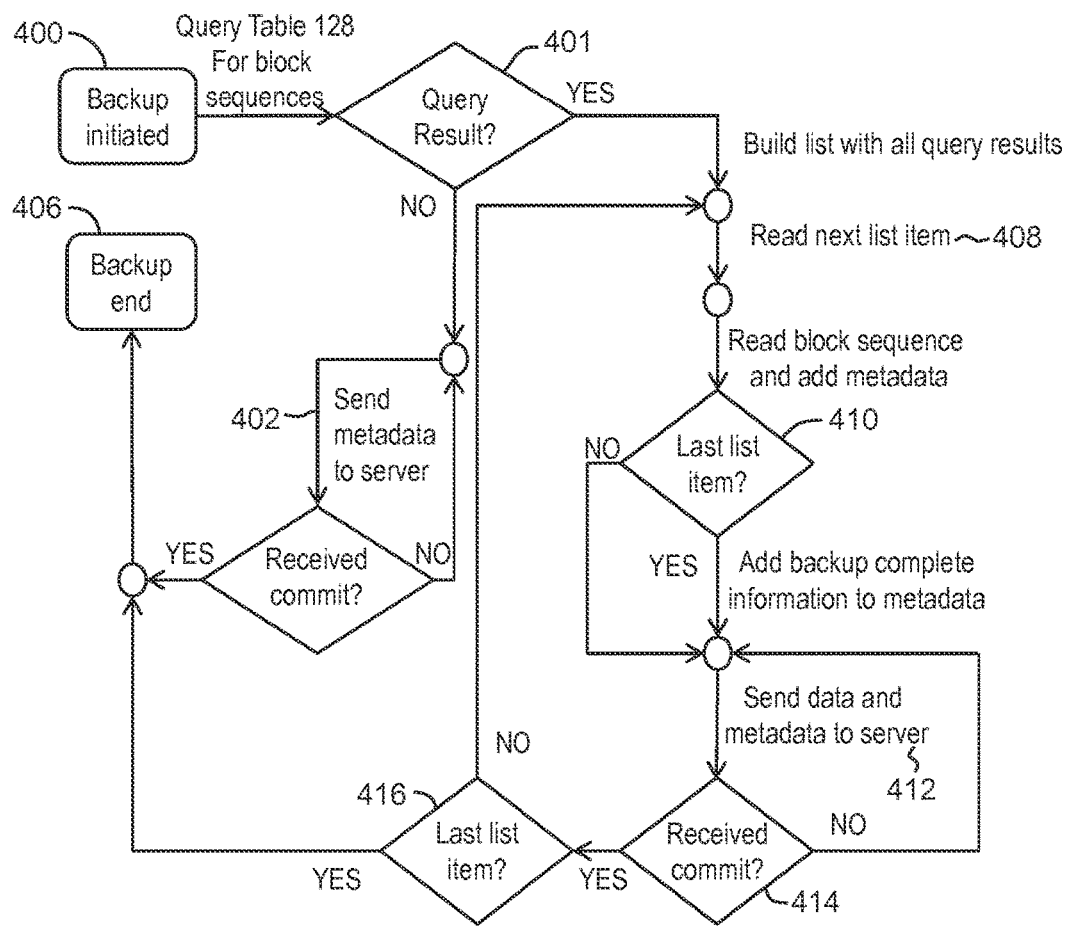
FIG. 4 illustrates an example backup processing on the backup client side.

FIG. 4 illustrates an example of backup processing on the backup client side for a backup of a data element, e.g., 135. After the backup is initiated, step 400, and the file system object or data element to be protected is known to the backup client, i.e., storage node, e.g., 110, the backup client queries table 128 to get block sequence information of the block sequences of the data element that are stored on the storage node, inquiry 401. If no result was received, the storage node sends metadata (e.g., the empty action complete 307 information) only to the backup server 126 to indicate that the backup on the local node has finished, step 402. The backup then ends, step 406. For each query result received, the storage node may read the item, step 408, in the query result list and collect data and metadata of the corresponding block sequence. If the currently processed list item is the last, inquiry 410, the storage node may set the metadata last or final sequence 307 to "TRUE". After the collection of the data and metadata has finished, the backup client sends the information on the block sequences to the backup server 126, step 412. Until the backup server 126 commits the information (e.g. informs the storage node that the backup is ended, complete or successful), inquiry 414, the storage node may retry the send. The retry of the send may be triggered for example by a reception of an error from the backup server 126. If the actual sent information stands for the final block sequence, inquiry 416, the backup ends. If the actual sent information doesn't stand for the final block sequence, inquiry 416, the novel backup client will proceed with the next item in the list.

Figure 5:
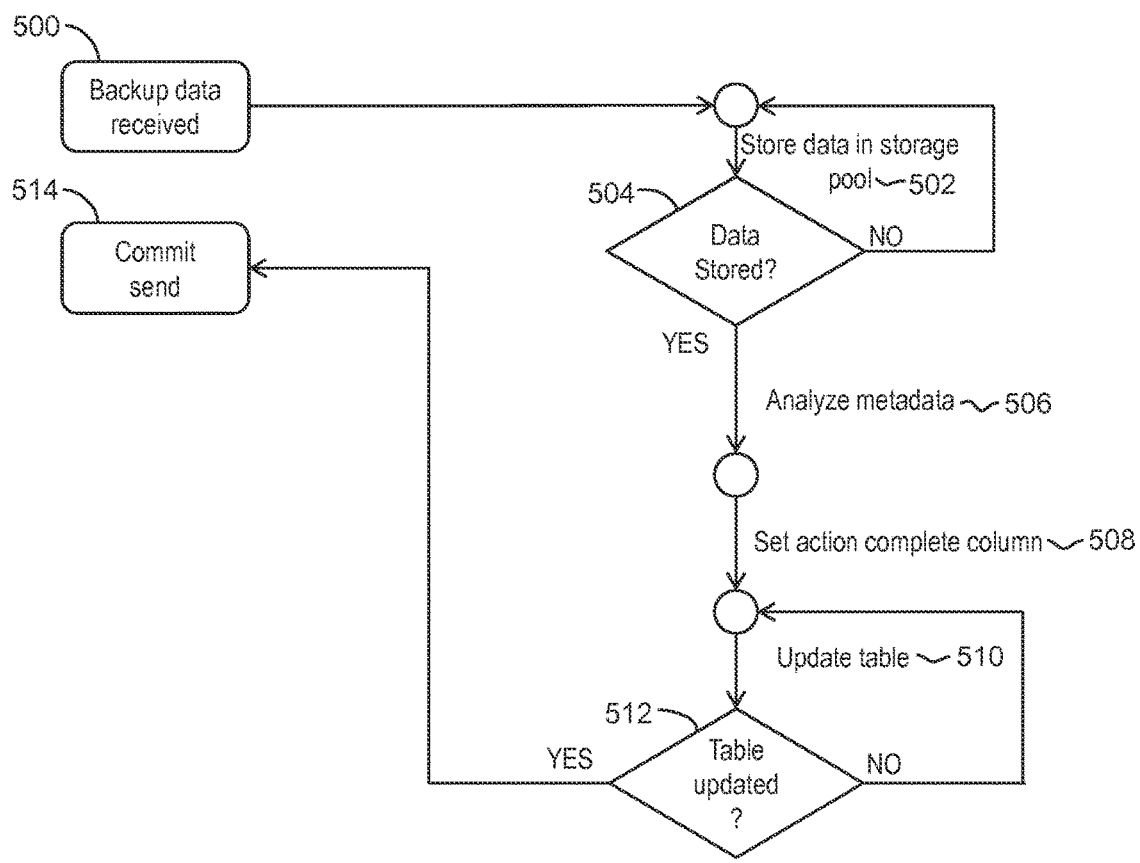
FIG. 5 illustrates an example backup processing on the backup server side.

FIG. 5 illustrates an example of backup processing on the backup server side. The backup server 126 receives backup data and metadata information from the storage node, step 500. The backup server 126 extracts the block sequence and stores it in a storage pool, step 502. After the backup data is successfully stored, INQUIRY 504, the metadata will be analyzed, step 506. The backup server 126 sets the field action complete 308 to "B", step 508, and updates table 300, step 510. After the table 300 was updated successfully, inquiry 512, the backup server 126 sends commit information to the storage node, step 514.

Figure 6:
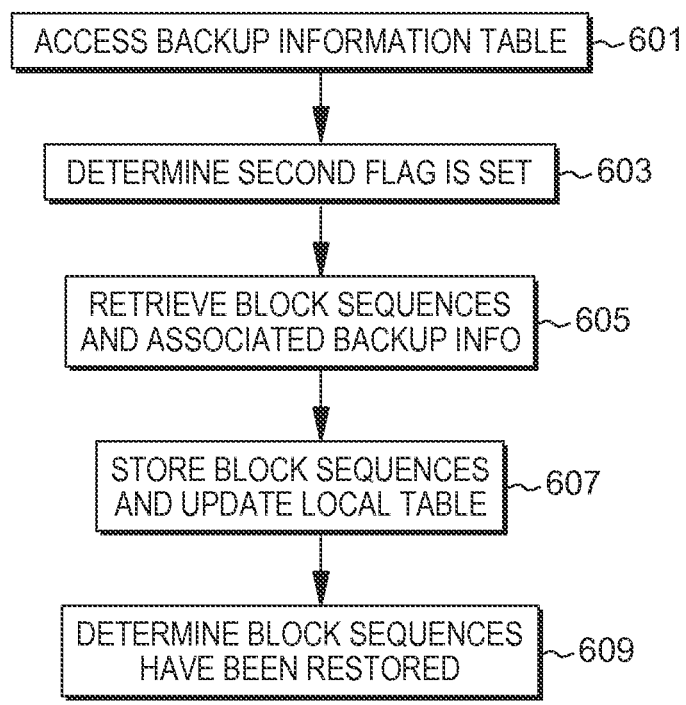
FIG. 6 is a flowchart of a method for restoring a data element in a shared nothing cluster system.

FIG. 6 is a flowchart of a method for restoring a data element, e.g., 135, stored in the SNCS 100. A restore request for restoring the data element 135 may be received at the storage nodes 110-112. For example, storage node 110 may receive the restore request and then forward it to the other storage nodes 111-112 via network 105. In an alternative example, the restore request may be received by each one of the storage nodes 110-112. For example, the restore request may be received via component 101 either automatically or triggered by a request of a user of the SNCS 100. The method comprises for each node of the storage nodes 110-112, in one embodiment:

In step 601, the backup information table 300 may be accessed for identifying entries associated with the block sequences 137A-E of the data element 135 that are associated with the node, e.g. 110. The backup information table 300 may be accessed by the node 110 by, e.g., requesting its content by the node from the backup server 126. In another example, the backup information table 300 may be accessed by the backup server 126, wherein the restore request is forwarded to the backup server 126 by the node 110.

In step 603, it is determined (by the node 110 or the backup server 126 who accessed the backup information table 300) that the second flag, e.g., Action Complete 308, is set for the data element. In other terms, at least part of the values of the field 308 associated with the block sequences of the data element 135 may be read, and if the second flag is set, e.g., the value of the field 308 is set to "B", it is thus determined that the second flag is set for the data element 135.

In step 605, the node 110 may retrieve the block sequences 137A-E and the associated backup information, e.g., the values stored in the fields 301-309 for entries 313-317. In an alternative example, the backup server 126 (if it has access to the backup information table 300 in step 601) may send the block sequences 137A-E and the associated backup information to the node 110.

In step 607, the block sequences 137A-E may be stored in the node 110 and the local table 128 may be updated using the backup information to indicate the stored block sequences 137A-E.

In step 609, the backup server 126 may determine that the block sequences 137A-E of the data element have been restored and responsive to this it marks the identified entries 313-317 as restored. For example, it may set the value of the field 308 to "BR" to indicate that the restore is complete.

Figure 7:
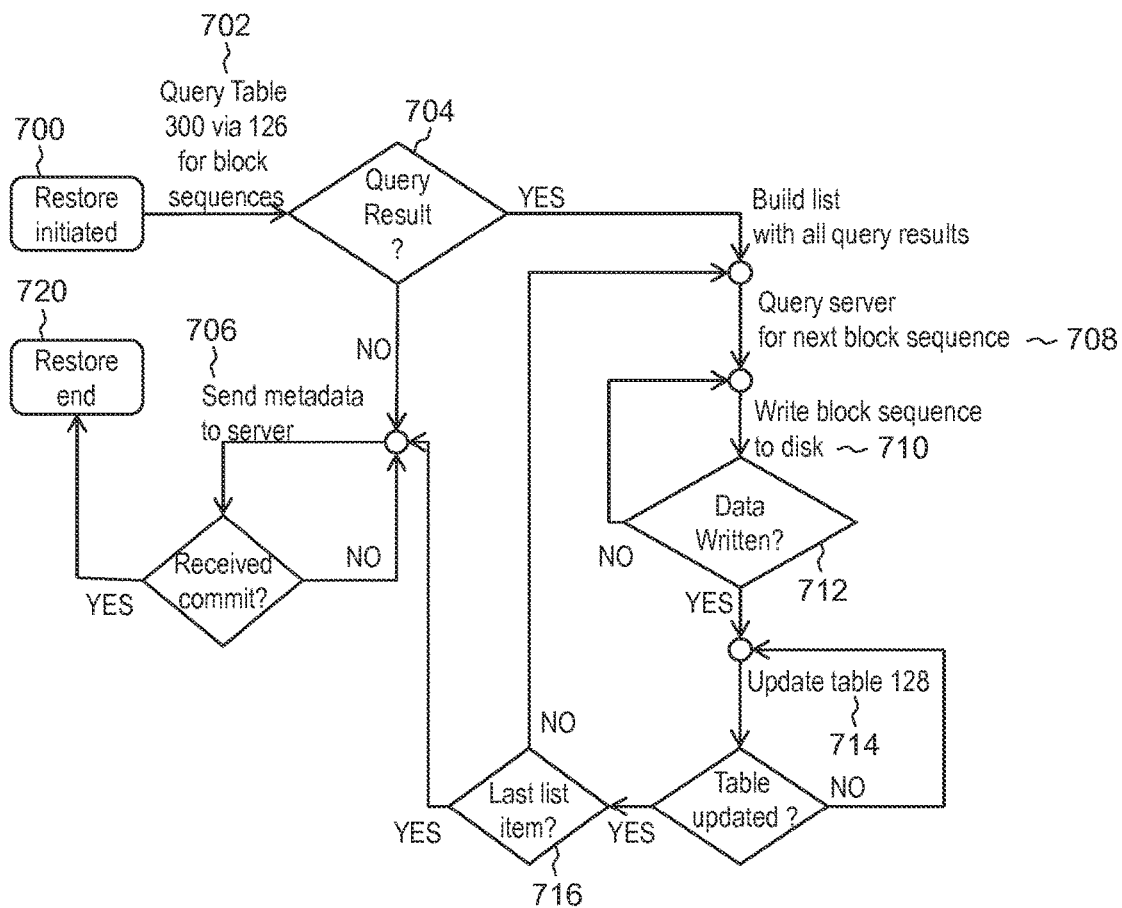
FIG. 7 illustrates an example restore processing on the backup client side.

FIG. 7 illustrates an example of restore processing on the backup client side. After the restore processing is initiated, step 700, and the storage node knows the file system object or data element, e.g. 135, name to be restored, the storage node queries table 300 via backup server 126 to receive a metadata list of all block sequences of the data element 135 that belong the storage node, step 702. (The information found for the storage node that sends the restore request is written to the metadata list by the backup server 126 and sent to the storage node.) If the query result is empty, inquiry 704, the storage node sends metadata to the backup server 126 that indicates that the restore processing has finished on the storage node, step 706. For each item in the query result list, the storage node will query the backup server 126 for the actual data of the corresponding block sequence, step 708. Next, the node may write the block sequence to disk, step 710. If the data was written to disk successfully, inquiry 712, the storage node may update table 128 with the appropriate metadata of the recently written block sequence, step 714. If the actual restored block sequence belongs to the last item in the query result list, step 716, the storage node may send metadata to the backup server 126 that indicates that the restore processing has finished on the storage node, step 706, and ends the restore processing, step 720.

Figure 8:
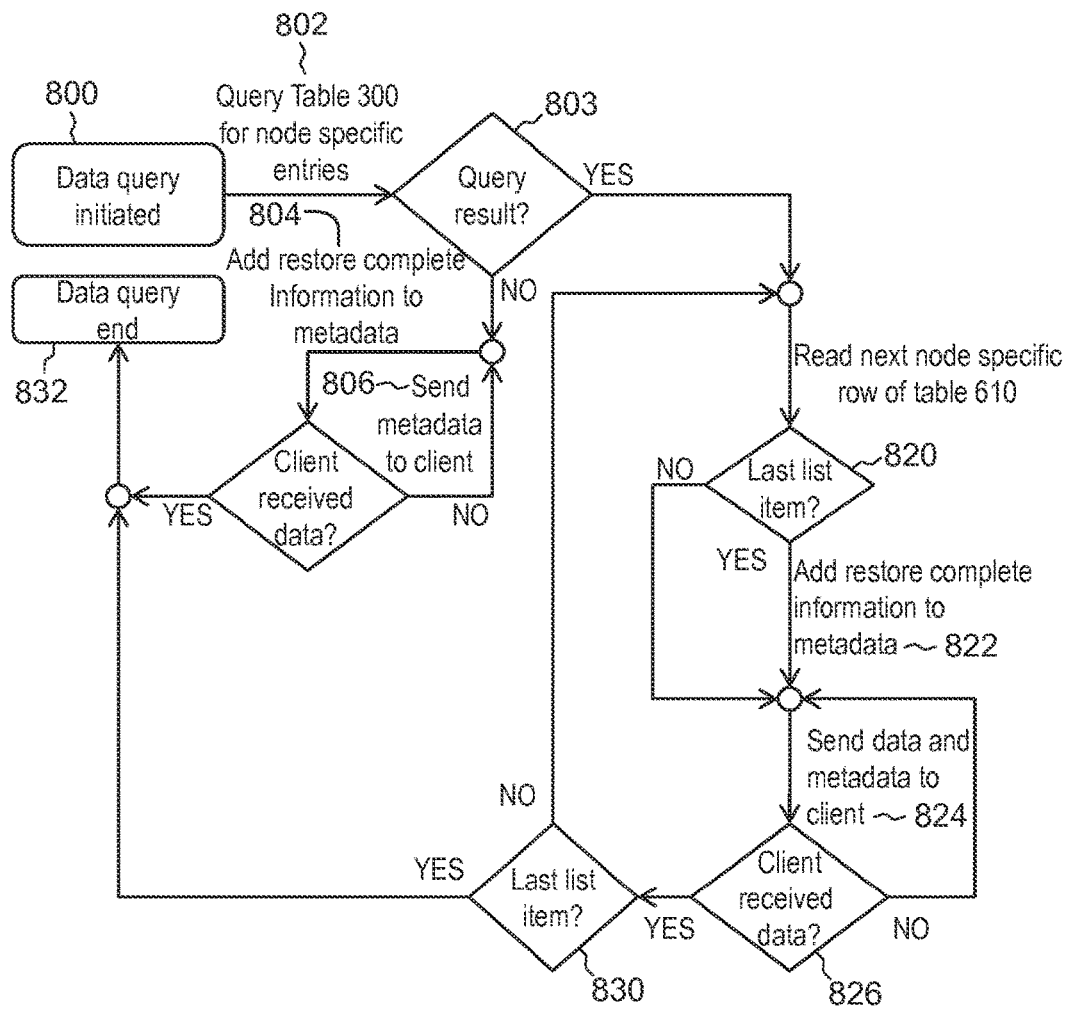
FIG. 8 illustrates the data query as part of the restore processing of the backup server.

FIG. 8 illustrates one example of the data query (i.e., the access to the backup information table 300 for processing the restore request) as part of the restore processing of the backup server 126. After the backup server 126 received a data query from the storage node, step 800, the backup server 126 may query table 300 to extract the required information, step 802. If no data exists for the querying storage node, inquiry 803, the backup server 126 sets the state to restore complete in table 300 for the querying storage node, step 804, and sends the empty data query result to the storage node, step 806. For each query result in the list, inquiry 803, the backup server 126 verifies whether the current list item is the last item in the list, inquiry 820. If the actual processed item is the last item in the list, the backup server 126 sets the action complete information for the item to "BR", step 822. The backup server 126 sends the block sequence and the corresponding metadata to the storage node, step 824. If the storage node indicates that the information was received the backup server 126, inquiry 826, it may process the next item in the list. If no more items exist, inquiry 830, the backup server 126 ends the restore processing, step 832.

In the following, other data processing methods that may be derived from the above method are described.

Archive Method:

The archive processing leans against the backup processing. The difference is the action complete indicator 308 in table 300 is set to "A". Furthermore, the storage node 110 may optionally remove the block sequences 137A and 137C of the file system object, i.e., data element 135 from the file system on the storage node 110 after the archive operation was committed from the backup server 126.

Retrieve Method:

The retrieve processing leans against the restore processing. The difference is that the action complete indicator 308 in table 300 is set to "AR".

Migrate Method:

The migrate processing leans against the backup processing. The difference is that the action complete indicator 308 in table 300 is set to "M". Furthermore, the storage node 110 may remove the block sequences 137A and 137C of the file system object 135 from the file system on all storage nodes in the SNCS 100 after the migrate operation is committed (e.g., the backup server sends a message that the migrate operation on the server side is complete or successful) from the backup server 126, except for the node owning the file object's metadata (inode). On this node it may be kept as many blocks on the local storage of the node, starting from the beginning of the file or data element 135, as is configured as the "stub size" of the file object 135. Reads within this stub size may not cause a recall operation to be triggered, but read operations beyond the stub size as well as write operations to the migrated file object will cause the recall method to be triggered.

Recall Method:

The retrieve processing leans against the restore processing. The difference is that the action complete indicator 308 in table 300 is set to "U".

Cluster-Optimized Data Transfer Method from Backup Server to Backup Clients:

This Cluster-optimized data transfer method does not assume the number of backup clients involved in a restore, retrieve, or recall operation is the same as was the case when the file object or the data element, e.g., 135 was backed up, archived, or migrated. Instead, it enables full utilization of a larger or smaller number of storage nodes in the cluster to be used for transferring file object data as part of a restore, retrieve, or recall operation. For example, the storage nodes 110-112 have been used to store the data element 135, and thus, used for the backup operation when the backup information is generated. However, the SNCS 100 may further comprise at least one more storage node (not shown). This method may make use of the storage nodes 110-112 and the additional storage node for, e.g., the restore operation such that when the data element 135 is restored or retrieved it may be stored not only on storage nodes 110-112 as before but it may be distributed over storage nodes 110-112 and the additional storage node. In another example, this method may make use of a reduced number of storage nodes as has been used for the backup operation, e.g., it may make use of two or one storage node of the storage nodes 110-112 in order to redistribute the data element 135 on the reduced number of nodes.

This cluster-optimized data transfer method involves the following steps, before data is transferred in parallel by all of the available storage storage nodes in the manner described in the sections above:

1. The initial storage node 110 (i.e., the storage node that has first received the request to backup the data element 135) or at least one of the storage nodes 110-112 communicates to the backup server 126 the number and identity (e.g., host name, IP address, etc.) of the storage nodes available in the SNCS 100 which can be used for the data transfer required to complete the restore, retrieve, or recall operation.
2. Using this information, the backup server 126 creates a new logical set of block sequences for the data element 135 being the subject of the operation, by dividing the total size of the data element 135 by the number of nodes available for the data transfer. This includes storing a new set of entries in the backup information table 300, along with a new block sequence number, begin, end, and "final sequence" specifications.
3. When the storage nodes interrogate the backup server 126 for the sequences to transfer, the backup server 126 consults these new entries for distributing the data transfer of the data element 135 (e.g., equally) across the available storage nodes.

In another implementation of steps 1 and 2, the storage node includes an indication of the current CPU load of each of the storage nodes available for data transfer in the set of information communicated to the backup server 126 in step 1. In step 2, then, the backup server 126 considers the current CPU load of the storage nodes in sizing the sequences passed to each of the nodes being transferred back to the node local storage.

In yet another implementation, the current I/O load of each storage node is considered in the same way.

As described herein, in one aspect, a method of operating a shared nothing cluster system, SNCS, is provided. The SNCS includes at least a first and a second storage node connected via a first network of the SNCS, the first and second storage nodes being configured to store a first set and a second set of blocks, respectively, wherein the first and second set of blocks form a single data element. The method includes, for instance, providing a backup server being connected to the first and second storage nodes, the backup server comprising a backup information table; configuring the first and second storage nodes to act as backup clients in a client-server configuration involving the backup server; upon receiving at the first and second storage nodes a request to backup the data element, the method further comprises for each node of the first and second storage nodes: identifying by the node one or more block sequences of consecutive blocks in the set of blocks of the data element stored in the node; sending by the node the identified one or more block sequences to the backup server; generating by the node backup information indicating at least: the order of each block in each of the one or more block sequences, the order of each of the one or more block sequences in the one or more block sequences, and the node and the data element; sending by the node the backup information to the backup server; storing by the backup server each received block sequence of the one or more block sequences in a respective storage location in the backup server; creating by the backup server for each of the received one or more block sequences an entry in the backup information table, wherein the entry comprises at least the storage location of the block sequence and the associated backup information in the backup server; adding and setting by the backup server a first flag into at least one of the created entries in case of a complete reception and storage of the one or more block sequences; in response to a determination by the backup server that the first and second sets of blocks are associated with the first flag, adding and setting a second flag to at least one of the created entries for the first and second sets of blocks indicating the completion of the backup of the data element.

In another aspect, a computer program product comprising a non-transitory computer readable storage medium having computer readable program code embodied therewith is provided. The program code being executable by a computer to perform the method steps of the method of any one of the preceding embodiments.

In another aspect, a shared nothing cluster system, SNCS, is provided. The SNCS includes at least a first and a second storage node connected via a first network of the SNCS, the first and second storage nodes being configured to store a first set and a second set of blocks, respectively, wherein the first and second set of blocks form a single data element. The SNCS further includes a backup server, wherein the first and second storage nodes are configured to act as backup clients in a client-server configuration involving the backup server, the SNCS being configured to perform at least part of the method steps of the method of any one of the preceding embodiments.

In another aspect, a storage node for a SNCS is provided. The storage node is configured to act as a backup client in a client-server configuration involving a backup server connected to the storage node; store a set of blocks of a data element in the storage node; receive a request to backup the data element; identify one or more block sequences of consecutive blocks in the set of blocks of the data element stored in the node; send the identified one or more block sequences to the backup server; generate backup information indicating at least the order of each block in each of the one or more block sequences, the order of each of the one or more block sequences in the one or more block sequences, and the node and the data element, and send the backup information to the backup server.

In another aspect, a backup server for a SNCS is provided. The backup server is configured to receive from each node of a first and a second storage node of the SNCS one or more block sequences and associated backup information, the first and second storage nodes being configured to store a first set and a second set of blocks respectively, wherein the first and second set of blocks form a single data element; store each received block sequence of the one or more block sequences in a respective storage location in the backup server; create for each of the received one or more block sequences an entry in a backup information table of the backup server, wherein the entry comprises at least the storage location of the block sequence and the associated backup information in the backup server; add and set a first flag into at least one of the created entries in case of a complete reception and storage of the one or more block sequences and in response to a determination that the first and second sets of blocks are associated with the first flag, add and set a second flag to at least one of the created entries for the first and second sets of blocks indicating the completion of the backup of the data element.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may, for instance, be a multi-core processor. A processor may also refer to a collection of processors within a single computer system or distributed amongst multiple computer systems. The term computing device should also be interpreted to possibly refer to a collection or network of computing devices, each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in the form of computer executable code when applicable. The amount of processing resources may indicate the use degree of each of the physical components, such as CPU, memory, and N/W (network) bandwidth included in the computer system and their money cost. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A method of operating a shared nothing cluster system, the shared nothing cluster system comprising at least a first and a second storage node connected via a first network of the shared nothing cluster system, the first and second storage nodes being configured to store a first set and second set of blocks respectively, wherein the first and second set of blocks form a single data element, the method comprising:
   providing a backup server being connected to the first and second storage nodes, the backup server comprising a backup information table;
   configuring the first and second storage nodes to act as backup clients in a client-server configuration involving the backup server;
   based on receiving at the first and second storage nodes a request to backup a data element, wherein the date element is comprised of one or more block sequences of the first and second set of blocks, for each node of the first and second storage nodes, in parallel:
      identifying by the node one or more block sequences of consecutive blocks in a set of blocks of the data element stored in the node;
      sending by the node the identified one or more block sequences to the backup server;
      generating by the node backup information indicating at least:
         an order of each block in each of the one or more block sequences of consecutive blocks in the set of blocks of the data element stored in the node;
         an order of each of the one or more block sequences in the one or more block sequences of consecutive blocks in the set of blocks of the data element stored in the node; and
         the node and the data element, wherein the generating is performed in parallel with the identifying;
      sending by the node the backup information to the backup server;
      storing by the backup server each received block sequence of the one or more block sequences in a respective storage location in the backup server;
      creating by the backup server for each of the received one or more block sequences an entry in the backup information table, wherein the entry comprises at least the storage location of the block sequence and associated backup information in the backup server;
      adding and setting by the backup server a first flag into at least one of the created entries, based on a complete reception and storage of the one or more block sequences; and
   based on a determination by the backup server that the first and second sets of blocks are associated with the first flag, adding and setting a second flag to at least one of the created entries for the first and second set of blocks indicating a completion of the backup of the data element.

2. The method of claim 1, wherein the shared nothing cluster system comprises a local table for storing placement information of the one or more block sequences of the data element, and the method further comprises:
   receiving at the first and second storage nodes a restore request for restoring the data element; and
   for each node of the first and second storage nodes:
      accessing the backup information table for identifying entries associated with the one or more block sequences of the data element that are associated with the node;
      determining that the second flag is set for the data element;
      retrieving the one or more block sequences and the associated backup information;
      storing the one or more block sequences in the node and updating the local table using the backup information to indicate the stored one or more block sequences; and
      determining that the one or more block sequences of the first and second set of blocks have been restored, and based thereon, marking the identified entries as restored.

3. The method of claim 1, wherein the adding and the setting by the backup server the first flag is performed after a waiting time is elapsed starting from a time at which a block sequence of the one or more block sequences is first received.

4. The method of claim 3, wherein the waiting time is determined by:
   based on receiving a first block sequence of the one or more block sequences:
      determining a transmission time delay for transmitting a selected block sequence of the one or more block sequences from the node to the backup server; and
      using the transmission time delay and a number of one or more block sequences for determining the waiting time.

5. The method of claim 1, further comprising deleting the identified one or more block sequences from the node.

6. The method of claim 5, further comprising generating by the node one or more links pointing to the identified one or more block sequences in the backup server and storing the one or more links in the one or more node.

7. The method of claim 1, further comprising based on a determination by the backup server that at least one of the first and second set of blocks is not associated with the first flag, sending a backup failure message to a sender of the request.

8. The method of claim 1, wherein the shared nothing cluster system further comprises a third storage node, the method further comprising:
- at least one node of the first and second storage nodes sending information indicating the first, second and third storage nodes;
- the backup server, based on setting the second flag, redistributing one or more blocks of the one or more block sequences of the data element into one or more restore block sequences;
- assigning the one or more restore block sequences to the first, second and third storage nodes; and
- updating the backup information table for associating to each of the first, second and third storage nodes its assigned restore block sequences and information indicative of the one or more restore block sequences.

9. The method of claim 8, wherein the information indicating the first, second and third storage nodes comprises a system load in each of the first, second and third storage nodes, wherein the assigning is performed based on the system load.

10. The method of claim 1, wherein the first and second storage nodes are connected to the backup server via a second network different from the first network.

11. A computer program product for operating a shared nothing cluster system, the shared nothing cluster system comprising at least a first and a second storage node connected via a first network of the shared nothing cluster system, the first and second storage nodes being configured to store a first set and second set of blocks respectively, wherein the first and second set of blocks form a single data element, the computer program product comprising:
- a non-transitory computer readable storage medium readable by a processing circuit and storing instructions for execution by the processing circuit for performing a method comprising:
  - providing a backup server being connected to the first and second storage nodes, the backup server comprising a backup information table;
  - configuring the first and second storage nodes to act as backup clients in a client-server configuration involving the backup server;
  - based on receiving at the first and second storage nodes a request to backup a data element, wherein the data element is comprised of one or more block sequences of the first and second set of blocks, for each node of the first and second storage nodes in parallel:
    - identifying by the node one or more block sequences of consecutive blocks in a set of blocks of the data element stored in the node;
    - sending by the node the identified one or more block sequences to the backup server;
    - generating by the node backup information indicating at least:
      - an order of each block in each of the one or more block sequences of consecutive blocks in the set of blocks of the data element stored in the node;
      - an order of each of the one or more block sequences in the one or more block sequences of consecutive blocks in the set of blocks of the data element stored in the node; and
      - the node and the data element, wherein the generating is performed in parallel with the identifying;
    - sending by the node the backup information to the backup server;
  - storing by the backup server each received block sequence of the one or more block sequences in a respective storage location in the backup server;
  - creating by the backup server for each of the received one or more block sequences an entry in the backup information table, wherein the entry comprises at least the storage location of the block sequence and associated backup information in the backup server;
  - adding and setting by the backup server a first flag into at least one of the created entries, based on a complete reception and storage of the one or more block sequences; and
  - based on a determination by the backup server that the first and second sets of blocks are associated with the first flag, adding and setting a second flag to at least one of the created entries for the first and second set of blocks indicating a completion of the backup of the data element.

12. The computer program product of claim 11, wherein the shared nothing cluster system comprises a local table for storing placement information of the one or more block sequences of the data element, and wherein the method further comprises:
- receiving at the first and second storage nodes a restore request for restoring the data element; and
- for each node of the first and second storage nodes:
  - accessing the backup information table for identifying entries associated with the one or more block sequences of the data element that are associated with the node;
  - determining that the second flag is set for the data element;
  - retrieving the one or more block sequences and the associated backup information;
  - storing the one or more block sequences in the node and updating the local table using the backup information to indicate the stored one or more block sequences; and
  - determining that the one or more block sequences of the first and second set of blocks have been restored, and based thereon, marking the identified entries as restored.

13. The computer program product of claim 11, wherein the adding and the setting by the backup server the first flag is performed after a waiting time is elapsed starting from a time at which a block sequence of the one or more block sequences is first received.

14. The computer program product of claim 13, wherein the waiting time is determined by:
- based on receiving a first block sequence of the one or more block sequences:
  - determining a transmission time delay for transmitting a selected block sequence of the one or more block sequences from the node to the backup server; and
  - using the transmission time delay and a number of one or more block sequences for determining the waiting time.

15. The computer program product of claim 11, wherein the shared nothing cluster system further comprises a third storage node, and wherein the method further comprises:
- at least one node of the first and second storage nodes sending information indicating the first, second and third storage nodes;

the backup server, based on setting the second flag, redistributing one or more blocks of the one or more block sequences of the data element into one or more restore block sequences;

assigning the one or more restore block sequences to the first, second and third storage nodes; and updating the backup information table for associating to each of the first, second and third storage nodes its assigned restore block sequences and information indicative of the one or more restore block sequences.

16. A computer system for operating a shared nothing cluster system, the shared nothing cluster system comprising at least a first and a second storage node connected via a first network of the shared nothing cluster system, the first and second storage nodes being configured to store a first set and a second set of blocks respectively, wherein the first and second set of blocks form a single data element, the computer system comprising:

a memory; and a processor in communications with the memory, wherein the computer system is configured to perform a method, said method comprising:

providing a backup server being connected to the first and second storage nodes, the backup server comprising a backup information table;

configuring the first and second storage nodes to act as backup clients in a client-server configuration involving the backup server;

based on receiving at the first and second storage nodes a request to backup a data element, wherein the data element is comprised of one or more block sequences of the first and second set of blocks, for each node of the first and second storage nodes, in parallel:

identifying by the node one or more block sequences of consecutive blocks in a set of blocks of the data element stored in the node;

sending by the node the identified one or more block sequences to the backup server;

generating by the node backup information indicating at least:

an order of each block in each of the one or more block sequences of consecutive blocks in the set of blocks of the data element stored in the node;

an order of each of the one or more block sequences in the one or more block sequences of consecutive blocks in the set of blocks of the data element stored in the node; and the node and the data element, wherein the generating is performed in parallel with the identifying;

sending by the node the backup information to the backup server;

storing by the backup server each received block sequence of the one or more block sequences in a respective storage location in the backup server;

creating by the backup server for each of the received one or more block sequences an entry in the backup information table, wherein the entry comprises at least the storage location of the block sequence and associated backup information in the backup server;

adding and setting by the backup server a first flag into at least one of the created entries, based on a complete reception and storage of the one or more block sequences; and based on a determination by the backup server that the first and second sets of blocks are associated with the first flag, adding and setting a second flag to at least one of the created entries for the first and second set of blocks indicating a completion of the backup of the data element.

17. The computer system of claim 16, wherein the shared nothing cluster system comprises a local table for storing placement information of the one or more block sequences of the data element, and wherein the method further comprises:

receiving at the first and second storage nodes a restore request for restoring the data element; and for each node of the first and second storage nodes:

accessing the backup information table for identifying entries associated with the one or more block sequences of the data element that are associated with the node;

determining that the second flag is set for the data element;

retrieving the one or more block sequences and the associated backup information;

storing the one or more block sequences in the node and updating the local table using the backup information to indicate the stored one or more block sequences; and determining that the one or more block sequences of the first and second set of blocks have been restored, and based thereon, marking the identified entries as restored.

18. The computer system of claim 16, wherein the adding and the setting by the backup server the first flag is performed after a waiting time is elapsed starting from a time at which a block sequence of the one or more block sequences is first received.

19. The computer system of claim 18, wherein the waiting time is determined by:

based on receiving a first block sequence of the one or more block sequences:

determining a transmission time delay for transmitting a selected block sequence of the one or more block sequences from the node to the backup server; and using the transmission time delay and a number of one or more block sequences for determining the waiting time.

* * * * *